United States Patent
Kates et al.

(10) Patent No.: US 6,181,588 B1
(45) Date of Patent: *Jan. 30, 2001

(54) CONSTANT POLARITY INPUT DEVICE INCLUDING SYNCHRONOUS BRIDGE RECTIFIER

(75) Inventors: Barry K. Kates, Austin; John A. Cummings, Round Rock, both of TX (US)

(73) Assignee: Dell USA, L.P., Round Rock, TX (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/160,831

(22) Filed: Sep. 25, 1998

(51) Int. Cl.[7] ..................................................... H02M 7/06
(52) U.S. Cl. ............................................. 363/126; 363/52
(58) Field of Search .................................. 363/81, 84, 89, 363/125, 126, 127, 52

(56) References Cited

U.S. PATENT DOCUMENTS

| | | | |
|---|---|---|---|
| 4,519,024 | * 5/1985 | Federico et al. | 363/127 |
| 4,811,191 | 3/1989 | Miller | 363/127 |
| 4,922,404 | * 5/1990 | Ludwig et al. | 363/89 |
| 4,935,857 | 6/1990 | Nguyen et al. | 363/17 |
| 4,984,147 | * 1/1991 | Araki | 363/84 |
| 5,038,266 | * 8/1991 | Callen et al. | 363/89 |
| 5,268,833 | 12/1993 | Axer | 363/127 |
| 5,329,439 | 7/1994 | Borojevic et al. | 363/87 |
| 5,438,498 | 8/1995 | Ingemi | 363/17 |
| 5,483,435 | * 1/1996 | Uchino | 363/81 |
| 5,590,032 | 12/1996 | Bowman et al. | 363/15 |
| 5,602,462 | 2/1997 | Stich et al. | 323/258 |
| 5,625,541 | 4/1997 | Rozman | 363/21 |
| 5,736,795 | 4/1998 | Zuehlke et al. | 307/130 |

* cited by examiner

*Primary Examiner*—Adolf Deneke Berhane
(74) *Attorney, Agent, or Firm*—Skjerven Morrill MacPherson LLP; Marc R. Ascolese

(57) ABSTRACT

A circuit including bridge rectifier, switches across one or more of the diodes of the bridge rectifier, and a comparator providing control signals to the switch or switches can be constructed to apply a constant polarity voltage to an electrical load, regardless of the polarity of the input power applied to the circuit. The comparator produces a control signal depending upon a comparison of the input power voltages, and the control signal activates one or more of the switches to allow current flow through an appropriate path in the circuit to yield the constant polarity across the electrical load. Thus, the circuit can protect the electrical load from an inappropriately applied voltage by switching the applied voltage's polarity. Because an activated switch can short a diode in the bridge rectifier, power loss associated with current flow through the diode is reduced. Additionally, the circuit can provide constant polarity across the electrical load with either AC or DC input power.

27 Claims, 2 Drawing Sheets

CONSTANT POLARITY INPUT DEVICE INCLUDING SYNCHRONOUS BRIDGE RECTIFIER

BACKGROUND OF THE INVENTION

1. Field of the Invention

This invention relates to power supplies for electronic devices and particularly to circuits to maintain a constant polarity across an electrical load.

2. Description of the Related Art

Electronic devices, and particularly portable electronic devices such as portable computers, cellular phones, and personal digital assistants (PDAs) typically make use of alternating current to direct current adapters ("AC-DC adapters," "AC adapters," or simply "adapters") either as a direct source of power, or as a source of power to charge on-board batteries. AC adapters can be built into such electronic devices, but given the size, weight, and cost constraints often imposed on such devices, AC adapters are more commonly provided as a separate module with a plug or cord for connecting the adapter to an AC outlet, and another cord for connecting the adapter to the electronic device through a connector.

Given the variety of electronic devices that use AC adapters, and the various output polarizations, voltage ratings, and current ratings of those adapters, an electronic device user is likely to have several, if not many, different adapters for different electronic devices. Consequently, matching the correct adapter to the intended device can be difficult because of similarity in appearance among adapters and similarity among the connectors associated with the adapters. Compounding this problem is the fact that adapters intended for different applications can be manufactured by the same company and look the same, yet have dissimilar electrical characteristics. Moreover, using the wrong adapter can damage expensive electronic equipment or even present a safety hazard.

Prior methods to prevent improper use of and/or mitigate the damage from improper use of an AC adapter generally fall into two categories: mechanical methods and electrical methods. The most common mechanical solution to the problem of improper adapter use is to provide the adapter and the electronic device using the adapter with unique connector keying such that the wrong connector cannot be inserted into the electronic device. One drawback to this method of preventing improper use of an adapter is that it prevents manufacturers from using standard connectors and adapters which allow the manufacturer to avoid the high costs of tooling, testing, and providing a custom part.

Electrical solutions typically include circuitry for clamping the improper input voltage with a dissapative device such as a zener diode, a metal oxide varistor (MOV), or a junction diode. These devices will only work if the input power source has power limiting within the capability of the dissapative device, and thus there ability to protect a device is limited. Such specialized circuits or components add cost and complexity to the electronic device. Additionally, operating conditions within the specification of the dissapative device are not always met, so damage to the electronic device can still result from using an improper adapter.

Accordingly, it is desirable to have a circuit that allows power input of various polarities, while supplying power with a constant polarity to an electrical load. Additionally, it is desirable to have such a circuit that can provide power having constant polarity given either AC or DC input power.

SUMMARY OF THE INVENTION

It has been discovered that a circuit including a bridge rectifier, switches across one or more of the diodes of the bridge rectifier, and a comparator to provide control signals to the switch or switches can be constructed to apply a constant polarity voltage to an electrical load, regardless of the polarity of the input power applied to the circuit. The comparator produces a control signal depending upon a comparison of the input power voltages, and the control signal activates one or more of the switches to allow current flow through an appropriate path in the circuit to yield the constant polarity across the electrical load. Thus, the circuit can protect the electrical load from an inappropriately applied voltage by switching the applied voltage's polarity. Because an activated switch can short a diode in the bridge rectifier, power loss associated with current flow through the diode is reduced. Additionally, the circuit can provide constant polarity across the electrical load with either AC or DC input power.

Accordingly, one aspect of the present invention provides a circuit including a first and a second input terminal, a first and a second output terminal, a bridge rectifier, a plurality of transistors, and a comparator. The bridge rectifier includes a plurality of diodes, and is coupled to the first and second input terminals and to the first and second output terminals. Ones of the plurality of transistors are coupled in parallel with ones of the plurality of diodes of the bridge rectifier. The comparator is coupled to the first and second input terminals, the first and second output terminals, and at least one of the plurality of transistors. The comparator is operable to provide a control signal to the at least one of the plurality of transistors depending upon a first signal received from the first input terminal and a second signal received from the second input terminal.

In another aspect of the invention, a computer system includes a processor, a memory coupled to the processor, and a circuit coupled to the processor and memory operable to deliver power to the processor and memory. The circuit includes a first and a second input terminal, a first and a second output terminal, a bridge rectifier, a plurality of transistors, and a comparator. The bridge rectifier includes a plurality of diodes, and is coupled to the first and second input terminals and to the first and second output terminals. Ones of the plurality of transistors are coupled in parallel with ones of the plurality of diodes of the bridge rectifier. The comparator is coupled to the first and second input terminals, the first and second output terminals, and at least one of the plurality of transistors. The comparator is operable to provide a control signal to the at least one of the plurality of transistors depending upon a first signal received from the first input terminal and a second signal received from the second input terminal.

In still another aspect of the invention, a method of maintaining a constant power supply polarity across an electrical load is disclosed. A first input voltage is compared with a second input voltage to identify which of the input voltages is more positive than the other. A first pair of switches in a circuit is activated when the first input voltage is more positive than the second input voltage. The switches are operable to receive the first and second input voltage so that activating the first pair of switches allows a voltage of a first polarity to develop across the electrical load. A second pair of switches in a circuit is activated when the second input voltage is more positive than the first input voltage. The switches are operable to receive the first and second input voltage so that activating the second pair of switches allows a voltage of the first polarity to develop across the electrical load.

In yet another aspect of the invention, a circuit includes a first and a second input terminal, a first and a second output terminal, a rectifying means, a first switching means, a second switching means, and a comparing means. The rectifying means is coupled to the first and second input terminals and coupled to the first and second output terminals for maintaining a constant polarity across an electrical load. The first switching means is for shorting a first portion of the rectifying means, and the second switching means is for shorting a second portion of the rectifying means. The comparing means is coupled to the first and second input terminals, the first and second output terminals, and at least one of the first and second switching means. The comparing means is for comparing a first voltage on the first input terminal with a second voltage on the second input terminal and providing a control signal to the at least one of the first and second switching means depending upon the comparison.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

Figure 1:
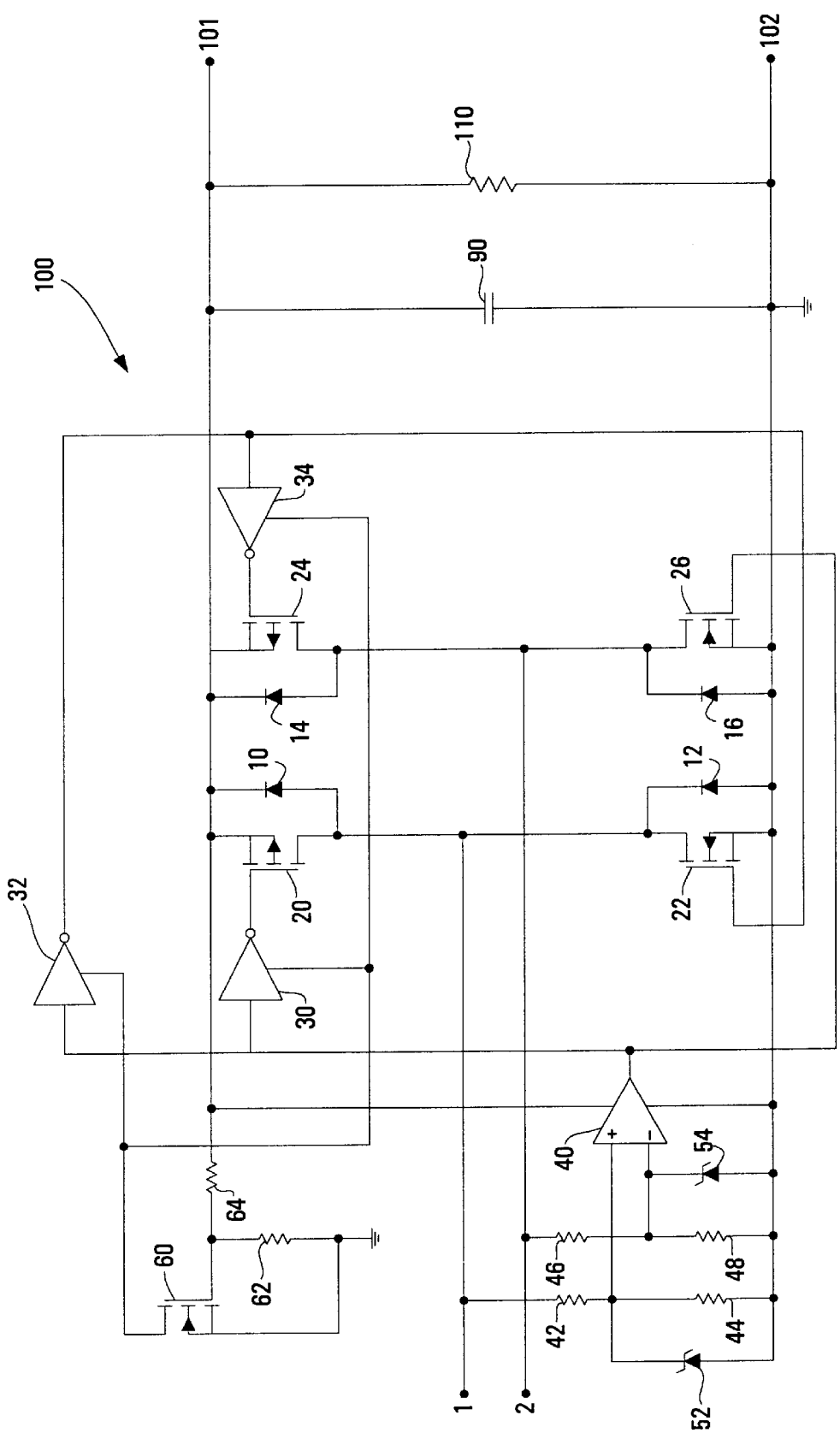
FIG. 1 shows a schematic diagram of a circuit that provides constant polarity across an electrical load.

FIG. 1 illustrates a circuit 100 which can receive input power signals at input terminals 1 and 2 and provides output power having a constant polarity across an electrical load (e.g. across resistor 110) at output terminals 101 and 102. Considering only terminals 1, 2, 101, and 102, and diodes 10, 12, 14, and 16, one can recognize a full-wave bridge rectifier of conventional design. The cathodes of diodes 10 and 14 are coupled together, the anodes of diodes 12 and 16 are coupled together, the cathode of diode 16 is coupled to the anode of diode 14, and the cathode of diode 12 is coupled to the anode of diode 10. Input power is received by the bridge rectifier from terminals 1 and 2 at the junction between diodes 10 and 12, and at the junction between diodes 14 and 16, respectively. Output terminal 101 is coupled to the cathodes of diodes 10 and 14, and output terminal 102 is coupled to the anodes of diodes 12 and 16. In operation, a positive voltage at input terminal 1 and a less positive voltage at input terminal 2 forward biases diodes 10 and 16 and reverse biases diodes 12 and 14. Consequently terminal 101 is held at a positive voltage with respect to terminal 102, i.e. current flows through resistor 110 from 102 to 101, which can be called a first electrical load polarity. When a positive voltage is applied at input terminal 2 and a less positive voltage at input terminal 1, diodes 12 and 14 are forward biased, and 10 and 16 are reversed biased. Nevertheless, terminal 101 is still held at a positive voltage with respect to terminal 102, thus maintaining the first electrical load polarity.

As mentioned above, one drawback of a conventional bridge rectifier is the power loss (e.g. resistive heating) associated with current flow through the forward biased diodes. That power loss can be reduced significantly by shorting the forward biased diodes after they have become forward biased. Transistors 20, 22, 24, and 26 are coupled across diodes 10, 12, 14, and 16, respectively, so that when activated (e.g. when turned on) each transistor can short its associated diode. Although the diodes and the transistors can be implemented as discrete components, in a preferred embodiment each diode is a body diode of the transistor (in this case an insulated-gate field effect transistor (IGFET) or metal-oxide semiconductor field effect transistor (MOSFET)). Body diodes are the intrinsic diodes in a MOSFET (typically a power MOSFET) formed between the body (i.e. the substrate) of the MOSFET and the channel. Such body diodes are formed because it is common for the body of a power MOSFET to be connected internally to the source. In many applications, the body diode of a MOSFET is an unfortunate by-product, but in circuit 100, the transistor/body diode pair is used to the circuit's advantage.

Control signals are applied to the gates of transistors 20, 22, 24, and 26 to turn the various transistors on or off as appropriate. Comparator 40 produces the control signals, and drivers 30, 32, and 34 invert the signal as needed. Comparator 40 can be implemented as a differential amplifier, an operational amplifier, or a specialized comparator circuit depending on the specific requirements of circuit 100. In general, however, the non-inverting input of comparator 40 receives the input voltage applied to terminal 1 after it is divided by the voltage divider formed by resistors 42 and 44. Zener diode 52 serves to clamp the input voltage into the non-inverting input of comparator 40. Similarly the inverting input of comparator 40 receives the input voltage applied to terminal 2 after it is divided by the voltage divider formed by resistors 46 and 48. Zener diode 54 serves to clamp the input voltage into the inverting input of comparator 40.

Since the bridge rectifier formed by diodes 10, 12, 14, and 16, initially presents a DC voltage across load 110, the null terminals of comparator 40 monitor the voltage across capacitor 90. When that voltage has stabilized, comparator 40 is allowed to control transistors 20, 22, 24, and 26. Transistor 60, in this case an n-channel MOSFET, allows the voltage at terminal 101 to be positive prior the transistor's enabling of drivers 30, 32, and 34.

When a positive voltage is applied at input terminal 1 and a less positive voltage at input terminal 2 is applied, the diodes are biased as described above. Comparator 40 receives the divided signals at its input terminals, and its output is driven high (e.g the output is saturated positively). Transistor 20 (in this case a p-channel MOSFET) is turned on because its gate is driven low by the control signal from comparator 40. Note that the control signal is inverted by driver 30 between comparator 40 and the gate of transistor 20. Transistor 26 (in this case a n-channel MOSFET) is turned on because its gate is driven high by the control signal from comparator 40. Consequently, while diodes 10 and 16 are forward biased due to the polarity of the input voltages, the diodes' associated transistors are turned on, thereby shorting the diodes and allowing current flow in the proper direction (i.e. yielding the desired polarity at 101 and 102) without the power losses associated with current flow through forward biased diodes.

When a positive voltage is applied at input terminal 2 and a less positive voltage at input terminal 1 is applied, the diodes are also biased as described above. Comparator 40 receives the divided signals at its input terminals, and its output is driven low (e.g. the output is saturated negatively). Transistor 24 (in this case a p-channel MOSFET) is turned on because its gate is driven low by the control signal from comparator 40. Note that the control signal is inverted once by driver 32 and again by driver 34 between comparator 40 and the gate of transistor 24. Transistor 22 (in this case a n-channel MOSFET) is turned on because its gate is driven high by the control signal from comparator 40. The control signal is inverted by driver 32 between comparator 40 and the gate of transistor 22. Consequently, while diodes 10 and 16 are forward biased due to the polarity of the input voltages, the diodes' associated transistors are turned on, thereby shorting the diodes and allowing current flow in the proper direction (i.e. yielding the desired polarity at 101 and 102) without the power losses associated with current flow through forward biased diodes.

Depending upon the specific components used in circuit 100, the circuit can produce a constant polarity across load 110 given either AC or DC power input at terminals 1 and 2. Additionally, those having ordinary skill in the art will readily recognize that a variety of different rectifier architectures, transistor types, diode types, comparators, and drivers can be used in place of the components described above and illustrated in FIG. 1.

Regarding terminology used herein, it will be appreciated by one skilled in the art that any of several expressions may be equally well used when describing the operation of a circuit including the various signals and nodes within the circuit. Any kind of signal, whether a logic signal or a more general analog signal, takes the physical form of a voltage level (or for some circuit technologies, a current level) of a node within the circuit. It may be correct to think of signals being conveyed on wires or buses. For example, one might describe a particular circuit operation as "the output of circuit 10 drives the voltage of node 11 toward VDD, thus asserting the signal OUT conveyed on node 11." This is an accurate, albeit somewhat cumbersome expression. Consequently, it is well known in the art to equally describe such a circuit operation as "circuit 10 drives node 11 high," as well as "node 11 is brought high by circuit 10," "circuit 10 pulls the OUT signal high" and "circuit 10 drives OUT high." Such shorthand phrases for describing circuit operation are more efficient to communicate details of circuit operation, particularly because the schematic diagrams in the figures clearly associate various signal names with the corresponding circuit blocks and node names. Phrases such as "pull high," "drive high," and "charge" are generally synonymous unless otherwise distinguished, as are the phrases "pull low," "drive low," and "discharge." It is to be appreciated by those skilled in the art that each of these and other similar phrases may be interchangeably used to describe common circuit operation, and no subtle inferences should be read into varied usage within this description.

It should also be noted that IGFET transistors are commonly referred to as MOSFET transistors (which literally is an acronym for "Metal-Oxide-Semiconductor Field Effect Transistor"), even though the gate material may be polysilicon or some material other than metal, and the dielectric may be oxynitride, nitride, or some material other than oxide. Use of such legacy terms as MOSFET should not necessarily be interpreted to literally specify a metal gate FET having an oxide dielectric.

While the invention has been described in light of the embodiments discussed above, one skilled in the art will recognize that certain substitutions may be easily made in the circuits without departing from the teachings of this disclosure. For example, many circuits using n-channel MOSFETs may be implemented using p-channel MOSFETs instead, as is well known in the art, provided the logic polarity and power supply potentials are reversed.

Figure 2A:
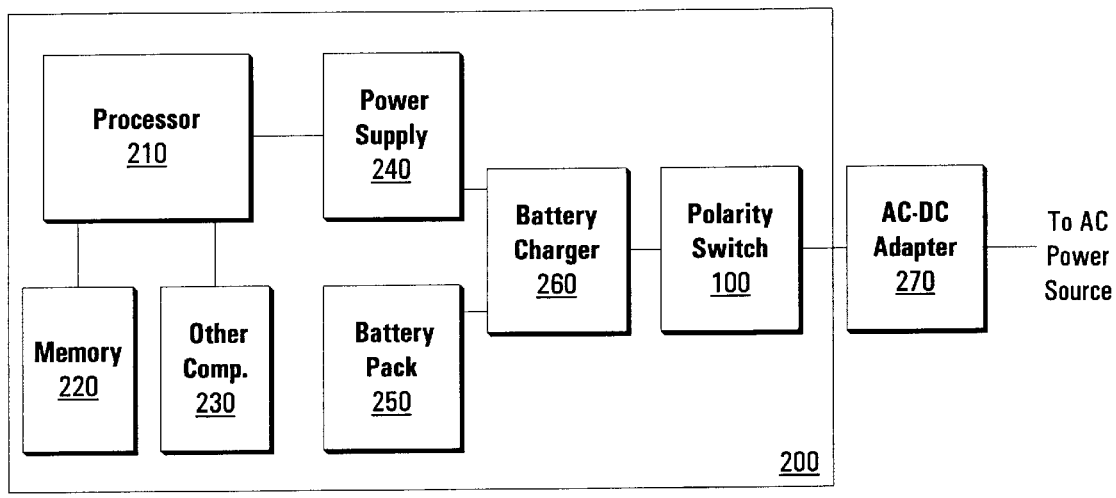
FIGS. 2A and 2B show block diagrams of two computer systems including the circuit of FIG. 1. In these figures, the electrical load is represented by the remaining elements of the computer system.

FIG. 2A illustrates a battery powered system 200 (in this case a portable computer system) that includes processor 210 with memory 220 and other computer system components 230 (e.g a hard disk drive, a graphics controller, a CD-ROM, a floppy disk drive, a network interface controller, a modem, etc.) coupled to processor 210. System 200 also includes power supply 240 (e.g. a DC-DC regulator), rechargeable battery pack 250, battery charger 260, and AC-DC adapter 270. Circuit 100 of FIG. 1 is implemented in system 200 as a polarity switch, where the electrical load of system 200 replaces resistor 110. System 200 receives power from power supply 240 which in turn receives power from either rechargeable battery pack 250 or an electrical outlet (not shown) via AC-DC adapter 270 and polarity switch 100. Battery charger 260 may charge rechargeable battery pack 100 if necessary. With polarity switch 100, adapter 270 can provide DC input power of either polarity (e.g. terminal 1 can have a higher or lower voltage with respect to terminal 2), yet the remainder of the system will have power applied to it with a constant polarity, thereby protecting system components.

Figure 2B:
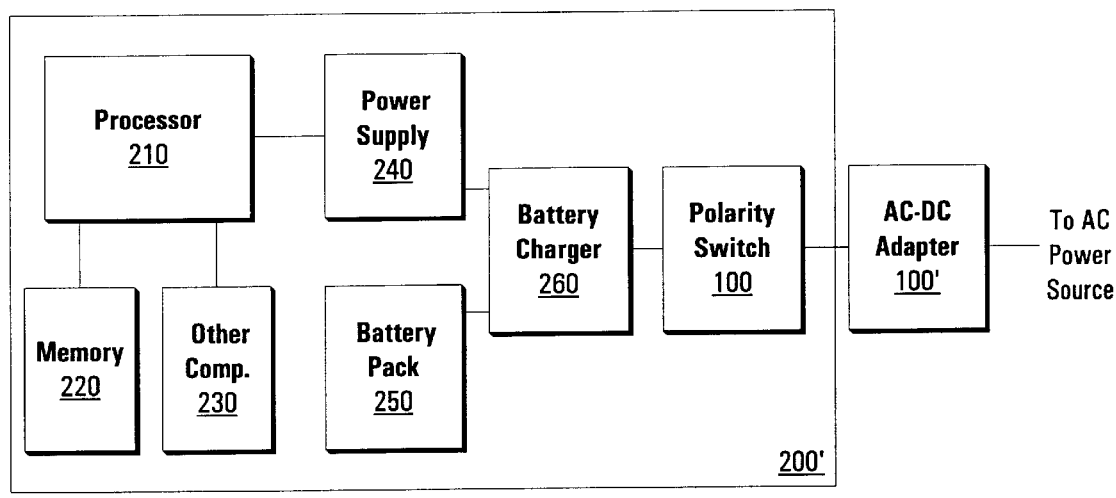

FIG. 2B illustrates a battery powered computer system 200' similar to the battery powered system 200 of FIG. 2A. In system 200', the AC-DC adapter 270 has been replaced with AC-DC adapter 100' which includes circuit 100 operating as a synchronous bridge rectifier, and additional components such as a transformer.

FIGS. 2A and 2B are merely illustrative of the electronic devices in which circuits 100 and 100' can be used. Consequently, circuits 100 and 100' need not be used in battery power electronic devices or in electronic devices that use rechargeable batteries, and are not limited to use in computer systems. Additionally, although adapters 270 and 100' have been described as a component separate from and external to system 200, the adapters can be physically incorporated into the system, as is the case in a portable computer that includes a built-in AC adapter.

The description of the invention set forth herein is illustrative and is not intended to limit the scope of the invention as set forth in the following claims. Variations and modifications of the embodiments disclosed herein may be made based on the description set forth herein, without departing from the scope and spirit of the invention as set forth in the following claims.

What is claimed is:

1. A circuit comprising:
    a first and a second input terminal;
    a first and a second output terminal;
    a bridge rectifier including a plurality of diodes, the bridge rectifier coupled to the first and second input terminals and coupled to the first and second output terminals;
    a plurality of transistors, ones of the plurality of transistors coupled in parallel with ones of the plurality of diodes of the bridge rectifier; and
    a comparator coupled to the first and second input terminals, the first and second output terminals, and at least one of the plurality of transistors, the comparator operable to provide a control signal to the at least one of the plurality of transistors depending upon a first signal received from the first input terminal and a second signal received from the second input terminal, the control signal operable to activate the at least one of the plurality of transistors when at least one of the ones of the plurality of diodes of the bridge rectifier is forward biased.

2. The circuit of claim 1 wherein the plurality of transistors are field-effect transistors (FETs) and the plurality of diodes are body diodes of the plurality of transistors.

3. The circuit of claim 1 wherein the control signal activates a first pair of transistors from the plurality of transistors.

4. The circuit of claim 1 wherein the second output terminal is coupled to ground.

5. The circuit of claim 1 wherein the control signal provided by the comparator is a first control signal when the first signal received from the first input terminal has a voltage more positive than a voltage of the second signal received from the second input terminal, and the control signal provided by the comparator is a second control signal when the first signal received from the first input terminal has a voltage less positive than the voltage of the second signal received from the second input terminal.

6. The circuit of claim 5 wherein the first control signal activates a first pair of transistors from the plurality of transistors, and the second control signal activates a second pair of transistors from the plurality of transistors so that a voltage between the first output terminal and the second output terminal has a substantially constant polarity.

7. The circuit of claim 1 further comprising a driver coupled between the comparator and a gate of one of the plurality of transistors.

8. The circuit of claim 7 wherein the driver inverts the control signal.

9. The circuit of claim 1 wherein the first and second input terminals are coupled to one of a direct current (DC) power source and an alternating current (AC) power source.

10. The circuit of claim 1 wherein the plurality of diodes includes a first, a second, a third, and a fourth diode, the anode of the first diode coupled to the cathode of the second diode, the anode of the second diode coupled to the anode of the fourth diode, the cathode of the fourth diode coupled to the anode of the third diode, and the cathode of the third diode coupled to the cathode of the first diode.

11. The circuit of claim 10 wherein the first input terminal is coupled to the anode of the third diode, the second input terminal is coupled to the anode of the first diode, the first output terminal is coupled to the cathode of the first diode, and the second output terminal is coupled to the anode of the second diode.

12. The circuit of claim 11 wherein the plurality of transistors includes a first, second, third, and fourth transistor, and the first, second, third, and fourth diodes are body diodes of the first, second, third, and fourth transistors, respectively.

13. The circuit of claim 12 wherein the first and third transistors are p-channel insulated gate field effect transistors (IGFETs), and the second and fourth transistors are n-channel IGFETs.

14. A computer system comprising:
  a processor;
  a memory coupled to the processor; and
  a circuit coupled to the processor and memory and operable to deliver power to the processor and memory, the circuit comprising:
    a first and a second input terminal;
    a first and a second output terminal;
    a bridge rectifier including a plurality of diodes, the bridge rectifier coupled to the first and second input terminals and coupled to the first and second output terminals;
    a plurality of transistors, ones of the plurality of transistors coupled in parallel with ones of the plurality of diodes of the bridge rectifier; and
    a comparator coupled to the first and second input terminals, the first and second output terminals, and at least one of the plurality of transistors, the comparator operable to provide a control signal to the at least one of the plurality of transistors depending upon a first signal received from the first input terminal and a second signal received from the second input terminal, the control signal operable to activate the at least one of the plurality of transistors when at least one of the ones of the plurality of diodes of the bridge rectifier is forward biased.

15. The computer system of claim 14 wherein the plurality of transistors are field-effect transistors (FETs) and the plurality of diodes are body diodes of the plurality of transistors.

16. The computer system of claim 14 wherein the first and second input terminals are operable to couple to one of a direct current (DC) power source and an alternating current (AC) power source.

17. The computer system of claim 14 wherein the control signal provided by the comparator is a first control signal when the first signal received from the first input terminal has a voltage more positive than a voltage of the second signal received from the second input terminal, and the control signal provided by the comparator is a second control signal when the first signal received from the first input terminal has a voltage less positive than the voltage of the second signal received from the second input terminal.

18. The computer system of claim 17 wherein the first control signal activates a first pair of transistors from the plurality of transistors, and the second control signal activates a second pair of transistors from the plurality of transistors so that a voltage between the first output terminal and the second output terminal has a substantially constant polarity.

19. The computer system of claim 14 further comprising a driver coupled between the comparator and a gate of one of the plurality of transistors.

20. The computer system of claim 19 wherein the driver inverts the control signal.

21. A method of maintaining a constant power supply polarity across an electrical load, the method comprising:
  comparing a first input voltage with a second input voltage to identify which of the input voltages is more positive than the other;
  activating a first pair of switches in a circuit when the first input voltage is more positive than the second input voltage, the switches operable to receive the first and second input voltage so that activating the first pair of switches allows a voltage of a first polarity to develop across the electrical load; and
  activating a second pair of switches in a circuit when the second input voltage is more positive than the first input voltage, the switches operable to receive the first and second input voltage so that activating the second pair of switches allows a voltage of the first polarity to develop across the electrical load.

22. The method of claim 21 wherein the both pairs of switches are transistors including body diodes, the method further comprising:
  shorting the body diodes of the first pair of switches when the first pair of switches is activated; and
  shorting the body diodes of the second pair of switches when the second pair of switches is activated.

23. The method of claim 21 wherein the first input voltage is a direct current (DC) voltage and the second input voltage is ground.

24. The method of claim 21 wherein the first input voltage and the second input voltage are derived from an alternating current (AC) power source.

25. A circuit comprising:

a first and a second input terminal;

a first and a second output terminal;

a rectifying means coupled to the first and second input terminals and coupled to the first and second output terminals, the rectifying means for maintaining a constant polarity across an electrical load;

a first switching means for shorting a first portion of the rectifying means;

a second switching means for shorting a second portion of the rectifying means; and a comparing means coupled to the first and second input terminals, the first and second output terminals, and at least one of the first and second switching means, the comparing means for comparing a first voltage on the first input terminal with a second voltage on the second input terminal and providing a control signal to the at least one of the first and second switching means depending upon the comparison, the control signal operable to activate the at least one of the first and second switching means when at least a portion of the rectifying means is forward biased.

26. The circuit of claim 25 wherein the control signal is a first control signal when the first voltage on the first input terminal is more positive than the second voltage on the second input terminal, and the control signal provided is a second control signal when the first voltage on the first input terminal is less positive than the second voltage on the second input terminal.

27. The circuit of claim 25 wherein the first and second input terminals are coupled to one of a direct current (DC) power source and an alternating current (AC) power source.

* * * * *